United States Patent Office

3,629,335
Patented Dec. 21, 1971

3,629,335
N-BENZYLIDENE CYCLOOCTYLAMINE
Jean-Claude Richer, B.P. 6128, Montreal, Quebec, Canada
No Drawing. Filed Aug. 11, 1969, Ser. No. 849,138
Int. Cl. C07c *119/00*
U.S. Cl. 260—566 F         1 Claim

ABSTRACT OF THE DISCLOSURE

Benzylidene cyclooctylamine is a compound medicinally useful for the treatment of central nervous system depression. The compound is prepared by azeotropically refluxing cyclooctylamine with benzaldehyde in a solvent such as to toluene.

BACKGROUND OF THE INVENTION (1) Field of the invention

This invention relates to a new central nervous system antidepressant.

(2) Description of the prior art (A) A compound of the prior art that is most closely related to the compounds of the instant invention is known as N-benzylcycooctanone imine, J.A.C.S., 88, 4701 (1966). No biological activity is reported for this compound.

(B) Cyclooctylamine, or its hydrochloride, is reported in German Pat. No. 1,178,846 and British Pat. 1,079,694. The hydrochloride is described as a virucide.

SUMMARY OF THE INVENTION

The compound of the present invention is characterized as having the formula

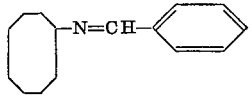

Benzylidene cyclooctylamine is a compound medicinally useful as an antidepressant in the treatment of central nervous system depression in mammals, including man. The compound is represented by the formula

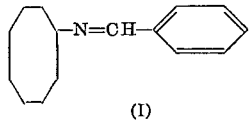

and is prepared by azeotropically refluxing cyclooctylamine with benzaldehyde in the presence of some inert solvent such as benzene, xylene, toluene, or the like.

The compound is especially interesting for its extremely low toxicity and non-stimulant character which fulfills most of the criteria for a potentially excellent antidepressant.

The compound is further unique in its anti-depressant activity as compared to the lack of similar activity in the closely related prior art compound known as N-benzyl-cyclooctanone imine, J.A.C.S., 88, 4701 (1966) which has the structure

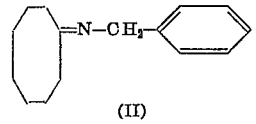

The fact that the compounds differ by just the position of the double bond can lead one to speculate as to the reasons for the presence or lack of the anti-depressant activity. Suffice it to say however, that both compounds are probably metabolized in vivo to different biologically active metabolites, one of which is an antidepressant while the other is inactive.

The compound I was compared with the known antidepressant, desipramine which has the structure

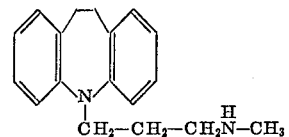

The oral dose in man of desipramine is reported to be 150 mg./day (Merck Index, 8th ed., pp. 331–332, 1968).

In the pharmacological workup illustrated by Chart I below, the compound compared favorably with desipramine in those standardized tests designed to point up the antidepressant activities of new compounds. MED equals minimum effective dose.

CHART I

| Test | Compound I, dose (mg./kg.) | Response | Desipramine MED, mg./kg. |
|---|---|---|---|
| $LD_{50}$, mouse p.o. | >1,350 | | 675 |
| $LD_{50}$, rat p.o. | 540 | | |
| Reserpine reversal, mouse p.o. | 300 | 8* | 3 |
|  | 150 | 5* |  |
|  | 75 | 3* |  |
|  | 37.5 | 2 |  |
| Tetrabenazine reversal, rat in (intraperitoneal) | 20 | 6* (ptosis and behavior) | [1] 15 |
|  | 10 | 3* (ptosis only) |  |
|  | 5 | 2 |  |
| Oxotremorine hypothermia, mouse i.p. | 40 | +2.8° C.* | 0.5 |
|  | 20 | +1.7° C. |  |
|  | 10 | +0.3° C. |  |
| Yohimbine potentiation, mouse i.p. | 40 | Significant | 4 |
|  | 20 | Significant |  |
|  | 10 | Not significant |  |
| Reserpine hypothermia, mouse p.o. | 20 | +4.6° C.* | 0.6 |
|  | 10 | +1.3° C. |  |
|  | 5 | +1.2° C. |  |

*Significant response.
[1] Ptosis and behavior.

The relatively high doses of Compound I required to obtain a significant response in some of these tests should be viewed in conjunction with the compound's low toxicity.

Compound I does not appear to possess monoamine oxidase inhibitor properties as it did not potentiate the effects of 5-hydroxytryptophan in the mouse at doses up to 200 mg./kg. p.o.

Compound I did not exhibit behavioral stimulant properties in the mouse (300 mg./kg. p.o.), cat (100 mg./kg. p.o.) and dog (40 mg./kg. p.o.). At these doses dogs and cats showed mild behavioral depression.

In the treatment of depression in animals, including man, the compounds of the present invention are administered orally and parenterally, in accordance with conventional procedures for the administration of antidepressants in an amount of from about 0.25 mg./kg./dose to 20 mg./kg./dose depending upon the route of administration. The preferred dosage for the compound of the invention is in the range of about 0.25 to about 5 mg./kg./dose three to four times a day.

In particular, the oral dose in man of the compound benzylidene cyclooctylamine is in the range of about 5 mg. to 125 mg. three to four times a day, and most preferably in the range of 5 to 75 mg. three to four times a day.

DESCRIPTION OF THE PREFERRED EMBODIMENTS

Example 1.—Preparation of benzylidene cyclooctylamine

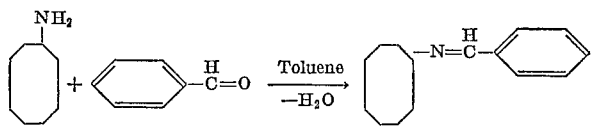

A solution of cyclooctylamine (12.7 grams, 0.1 mole) and benzaldehyde (10.6 grams, 0.1 mole) in 50 ml. of toluene was refluxed for about ten hours while collecting the water of reaction in a Dean-Stark trap by azeotropic distillation. The resultant solution was concentrated by distillation in vacuo and the remaining residue was distilled at 7–10 mm. Hg pressure to yield the benzylidene cyclooctylamine at 160–165° C., 15 grams yield (75%).

*Analysis.*—Calcd. for $C_{15}H_{21}N$ (percent): C, 83.67; H, 9.83; N, 6.50. Found (percent): C, 83.70; H, 9.76; N, 6.65.

Ultra violet spectrum in 95% ethanol gave a maximum at 244 m$\mu$, $\alpha$=88. The compound had an infrared spectrum and nuclear magnetic resonance spectrum in accord with the structure.

I claim:
1. The compound having the formula

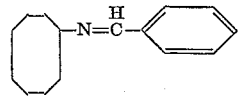

References Cited

UNITED STATES PATENTS 3,153,093  10/1964  Horrom et al. _____ 260—570.5

OTHER REFERENCES

Beilstein's Handboch der Organischen Chemie, vol. 7, pp. 831–32 (1968).

BERNARD HELFIN, Primary Examiner

G. A. SCHWARTZ, Assistant Examiner

U.S. Cl. X.R.

260—999